United States Patent
Sundaresan et al.

(10) Patent No.: US 6,519,602 B2
(45) Date of Patent: Feb. 11, 2003

(54) SYSTEM AND METHOD FOR THE AUTOMATIC CONSTRUCTION OF GENERALIZATION-SPECIALIZATION HIERARCHY OF TERMS FROM A DATABASE OF TERMS AND ASSOCIATED MEANINGS

(75) Inventors: Neelakantan Sundaresan, San Jose, CA (US); Jeonghee Yi, San Jose, CA (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/440,203

(22) Filed: Nov. 15, 1999

(65) Prior Publication Data

US 2002/0178136 A1 Nov. 28, 2002

(51) Int. Cl.$^7$ ............................................. G06F 17/30
(52) U.S. Cl. ........................ 707/100; 707/1; 707/3; 707/6; 707/102; 707/513; 707/514
(58) Field of Search ............... 707/1–8, 10, 100–104.1, 707/200–202, 501.1, 516, 907, 500.1, 512–514; 709/200–225

(56) References Cited

U.S. PATENT DOCUMENTS

| | | | |
|---|---|---|---|
| 5,745,360 A | | 4/1998 | Leone et al. ................. 364/140 |
| 5,748,186 A | * | 5/1998 | Raman ..................... 707/500.1 |
| 5,809,499 A | * | 9/1998 | Wong et al. ............. 178/18.01 |
| 5,819,260 A | | 10/1998 | Lu et al. ......................... 707/3 |
| 5,857,179 A | | 1/1999 | Vaithyanathan et al. ........ 707/2 |
| 6,122,647 A | * | 9/2000 | Horowitz et al. ........... 707/513 |
| 6,128,613 A | * | 10/2000 | Wong et al. .................... 707/5 |
| 6,128,619 A | * | 10/2000 | Fogarasi et al. .............. 707/10 |
| 6,240,407 B1 | * | 5/2001 | Chang et al. ................... 707/1 |
| 6,243,700 B1 | * | 6/2001 | Zellweger ................... 345/866 |
| 6,279,006 B1 | * | 8/2001 | Shigemi et al. ............. 707/100 |

OTHER PUBLICATIONS

Hiroki Arimura et al AGeneralization of the Least general generalization, Machine Intelligence 13, pp. 59–85, 1994.*

Shan–Hwei Nienhuys–Cheng, Least generalizations and greatest specializations of sets of clauses, Journal of Artificial Intelligence Research, 1996, pp341–363.*

R. Larson, "Bibliometrics of the World Wide Web: An Exploratory Analysis of the Intellectual Structure of Cyberspace," the Proceedings of the 1966 American Society for Information Science Annual Meeting, also published as a technical report, School of Information Management and Systems, University of California, Berkeley, 1996, which is published on the Word Wide Web at URL: http://sherlock-.sims.berkeley.edu/docs/asis96/asis96.html.

D. Gibson et al., "Inferring Web Communities from Link Topology" Proceedings of the $9^{th}$ ACM. Conference on Hypertext and Hypermedia, Pittsburgh, PA, 1998.

D. Turnbull. "Bibliometrics and the World Wide Web," Technical Report University of Toronto, 1996.

(List continued on next page.)

*Primary Examiner*—Srirama Channavajjala
(74) *Attorney, Agent, or Firm*—Samuel A. Kassatly (57) ABSTRACT

A computer program product is provided as an automatic mining system to build a generalization hierarchy of terms from a database of terms and associated meanings, using for example the Least General Generalization (LGG) model. The automatic mining system is comprised of a terms database, an augmentation module, a generalization detection module, and a hierarchy database. The terms database stores the terms and their meanings, and the hierarchy database stores the generalization hierarchy which is defined by a set of edges and nodes. The augmentation module updates the terms using the LGG model. The generalization detection module maps the generalizations derived by the augmentation module, updates the edges, and derives a generalization hierarchy. In operation, the automatic mining system begins with no predefined taxonomy of the concept terms, and the LGG model derives a generalization hierarchy, modeled as a Directed Acyclic Graph from the terms.

9 Claims, 5 Drawing Sheets

OTHER PUBLICATIONS

K. McCain, "Mapping Authors in Intellectual Space: A technical Overview," Journal of the American Society for Information Science, 41(6):433–443, 1990.

S. Brin, "Extracting Patterns and Relations from the World Wide Web," WebDB, Valencia, Spain, 1998.

R. Agrawal et al., "Fast Algorithms for Mining Association Rules," Proc. of the 20th Int'l Conference on VLBD, Santiago, Chile, Sep. 1994.

R. Agrawal et al., Mining Association Rules Between Sets of Items in Large Databases, Proceedings of ACM SIGMOD Conference on Management of Data, pp. 207–216, Washington, D.C., May 1993.

S. Chakrabarti et al., "Focused Crawling: A New Approach to Topic–Specific Web Resource Discovery," Proc. of The $8^{th}$ International World Wide Web Conference, Toronto, Canada, May 1999.

B. Huberman et al., "Strong Regularities in World Wide Web Surfing," Xerox Palo Alto Research Center.

A. Hutchunson, "Metrics on Terms and Clauses," Department of Computer Science, King's College London.

J. Kleinberg, "Authoritative Sources in a Hyperlinked Environment," Proc. of 9th ACM–SIAM Symposium on Discrete Algorithms, May 1997.

R. Srikant et al., "Mining Generalized Association Rules," Proceedings of the $21^{st}$ VLDB Conference, Zurich, Switzerland, 1995.

W. Li et al., "Facilitating complex Web queries through visual user interfaces and query relaxation," published on the Word Wide Web at URL: http://www.7scu.edu.au/programme/fullpapers/1936/com1936.htm as of Aug. 16, 1999.

G. Piatetsky–Shapiro, "Discovery, Analysis, and Presentation of Strong Rules," pp. 229–248.

R. Miller et al., "SPHINX: A Framework for Creating Personal, Site–specific Web Crawlers," published on the Word Wide Web at URL: http://www.7scu.edu.au/programme/fullpapers/1875/com1875.htm as of Aug. 16, 1999.

S. Soderland, "Learning to Extract Text–based Information from the World Wide Web," American Association for Artificial Intelligence (www.aaai.org), pp. 251–254.

G. Plotkin. "A Note Inductive Generalization," pp. 153–163.

R. Feldman et al., "Mining Associations in Text in the Presence of Background Knowledge," Proceedings of the Second International Conference on Knowledge Discovery and Data Mining, Aug. 2–4, 1996, Portland, Oregon.

R. Kumar et al., "Trawling the Web for Emerging Cyber––Communities," published on the Word Wide Web at URL: http://www.8.org/w8–papers/4a–search–mining/trawling/trawling.html as of Nov. 13, 1999.

"Acronym Finder", published on the Word Wide Web at URL:http://acronymfinder.com/as of Sep. 4, 1999.

* cited by examiner

SYSTEM AND METHOD FOR THE AUTOMATIC CONSTRUCTION OF GENERALIZATION-SPECIALIZATION HIERARCHY OF TERMS FROM A DATABASE OF TERMS AND ASSOCIATED MEANINGS

CROSS-REFERENCE TO RELATED APPLICATIONS

This application relates to co-pending U.S. patent applications Ser. No. 09/440,625, is now U.S. Pat. No. 6,385,629 titled "System and Method for the Automatic Mining of Acronym-expansion Pairs Patterns and Formation Rules", Ser. No. 09/439,379, is now pending titled "System and Method for the Automatic Mining of Patterns and Relations", Ser. No. 09/440,602, is now pending titled "System and Method for the Automatic Recognition of Relevant Terms by Mining Link Annotations", Ser. No. 09/439,758, is now pending titled "System and Method for the Automatic Discovery of Relevant Terms from the World Wide Web", and Ser. No. 09/440,626, is now pending titled "System and Method for the Automatic Mining of New Relationships", all of which are assigned to, and were filed by the same assignee as this application on even date herewith, and are incorporated herein by reference in their entirety.

FIELD OF THE INVENTION

The present invention relates to the field of data mining, and particularly to a software system and associated method for the automatic construction of a generalization-specialization hierarchy of terms from a database of terms and associated meanings, including but not limited to large text databases of unstructured information such as the World Wide Web (WWW). More specifically, the present invention relates to the automatic and iterative recognition of relevant terms by association mining and refinement of co-occurrences using, for example, the Least General Generalization (LGG) model.

BACKGROUND OF THE INVENTION

The World Wide Web (WWW) is a vast and open communications network where computer users can access available data, digitally encoded documents, books, pictures, and sounds. With the explosive growth and diversity of WWW authors, published information is oftentimes unstructured and widely scattered. Although search engines play an important role in furnishing desired information to the end users, the organization of the information lacks structure and consistency. Web spiders crawl web pages and index them to serve the search engines. As the web spiders visit web pages, they could look for, and learn pieces of information that would otherwise remain undetected.

Current search engines are designed to identify pages with specific phrases and offer limited search capabilities. For example, search engines cannot search for phrases that relate in a particular way, such as books and authors. Bibliometrics involves the study of the world of authorship and citations. It measures the co-citation strength, which is a measure of the similarity between two technical papers on the basis of their common citations. Statistical techniques are used to compute this measures. In typical bibliometric situations the citations and authorship are explicit and do not need to be mined. One of the limitations of the bibliometrics is that it cannot be used to extract buried information in the text.

Exemplary bibliometric studies are reported in: R. Larson, "Bibliometrics of the World Wide Web: An Exploratory Analysis of the Intellectual Structure of Cyberspace," Technical report, School of Information Management and Systems, University of California, Berkeley, 1996. http://sherlock.sims.berkeley.edu/docs/asis96/asis96.html; K. McCain, "Mapping Authors in Intellectual Space: A technical Overview," Journal of the American Society for Information Science, 41(6):433–443, 1990. A Dual Iterative Pattern Relation Expansion (DIPRE) method that addresses the problem of extracting (author, book) relationships from the web is described in S. Brin, "Extracting Patterns and Relations from the World Wide Web," WebDB, Valencia, Spain, 1998.

Another area to identify a set of related information on the World Wide Web is the Hyperlink-Induced Topic Search (HITS). HITS is a system that identifies authoritative web pages on the basis of the link structure of web pages. It iteratively identifies good hubs, that is pages that point to good authorities, and good authorities, that is pages pointed to by good hub pages. This technique has been extended to identify communities on the web, and to target a web crawler. One of HITS' limitations resides in the link topology of the pattern space, where the hubs and the authorities are of the same kind. i.e., they are all web pages. HITS is not defined in the text of web pages in the form of phrases containing relations in specific patterns. Exemplary HITS studies are reported in: D. Gibson et al., "Inferring Web Communities from Link Topology," HyperText, pages 225–234, Pittsburgh, Pa., 1998; J. Kleinberg, "Authoritative Sources in a Hyperlinked Environment," Proc. of 9th ACM-SIAM Symposium on Discrete Algorithms, May 1997; R. Kumar, "Trawling the Web for Emerging Cyber-Communities," published on the WWW at URL: http://www8.org/w8-papers/4a-search-mining/trawling/trawling.html) as of Nov. 13, 1999; and S. Chakrabarti et al. "Focused Crawling: A New Approach to Topic-Specific Web Resource Discovery," Proc. of The $8^{th}$ International World Wide Web Conference, Toronto, Canada, May 1999.

Furthermore, not only is the quantity of WWW material increasing, but the types of digitized material are also increasing. For example, it is possible to store alphanumeric texts, data, audio recordings, pictures, photographs, drawings, images, video and prints. However, such large quantities of materials is of little value unless it the desired information is readily retrievable. While, as discussed above, certain techniques have been developed for accessing certain types of textual materials, these techniques are at best moderately adequate for accessing graphic, audio or other specialized materials. Consequently, there are large bodies of published materials that remain inaccessible and thus unusable or significantly under utilized.

A common technique for accessing textual materials is by means of a "keyword" combination, generally with boolean connections between the words or terms. This searching technique suffers from several drawbacks. First, the use of this technique is limited to text and is not usable for other types of material. Second, in order to develop a searchable database of terms, the host computer must usually download the entire documents, which is a time-consuming process, and does not normally provide an association between related terms and concepts.

Exemplary work in scalable data mining technology, is described in the following references: R. Agrawal et al., "Mining Association Rules Between Sets of Items in Large Databases, Proceedings of ACM SIGMOD Conference on Management of Data, pp. 207–216, Washington, D.C., May 1993; R. Agrawal et al., "Fast Algorithms for Mining Association Rules," Proc. of the 20th Int'l Conference on VLDB, Santiago, Chile, September 1994; and S. Brin, "Extracting Patterns and Relations from the World Wide Web," WebDB, Valencia, Spain, 1998, supra. Such work has been successfully applied to identify co-occurring patterns in many real world problems including market basket analysis, cross-marketing, store layout, and customer segmentation based on buying patterns.

Early work on applying association to texts can be found in FACT system, described in R. Feldman et al., "Mining Associations in Text in the Presence of Background Knowledge," Proceedings of the Second International Conference on Knowledge Discovery and Data Mining, Aug. 2–4, 1996, Portland, Oreg. It discovers associations amongst only keywords representing the topics of the document. The FACT system assumes that a set of predefined keywords describing the document is available. Such an assumption might not be too unrealistic for a set of well annotated documents or for a classes of documents for which text categorization system automatically produces reasonably good annotations with keywords. However, the assumption generally does not hold true for WWW pages since a major portion of the WWW pages is not well annotated. Annotation of the WWW pages by general text categorization techniques can perform poorly, in that these techniques use natural language processing (NLP) that expect grammatically correct sentences, and WWW pages frequently consist of irregular sentences.

There is therefore a great and still unsatisfied need for a software system and associated methods for the automatic construction of a generalization-specialization hierarchy of terms from an unstructured database of terms and associated meanings, with a high degree of accuracy and confidence, and with minimal human interference.

SUMMARY OF THE INVENTION

In accordance with the present invention, a computer program product is provided as an automatic mining system to build a generalization hierarchy of terms from a database of terms and associated meanings. The system and methods enable the automatic and iterative recognition of relevant terms by association mining and refinement of co-occurrences using, for example, the Least General Generalization (LGG) model.

The automatic mining system is generally comprised of a terms database, an augmentation module, a generalization detection module and a hierarchy database. The terms database stores the sets of terms (Ai) and their associated meanings (Mi), and the hierarchy database stores the generalization hierarchy (Hi) mined by the automatic mining system. The set of terms (Ai) includes the set of generalizations (Li) that have been mined by the automatic mining system, and the generalization hierarchy (Hi) is defined by a set of edges (Ei) and a set of terms (Ai).

One function of the augmentation module is to update the set of terms (Ai), knowing the terms (ai) stored in the terms database. This feature is implemented by a generalization technique such as the "Least General Generalization" or LGG model. The generalization detection module maps the LGG sets ($L_{i-1}$) that are stored in the terms database and the LGG terms {li} that are derived by the augmentation module, updates the set of edges (Ei), and derives a generalization hierarchy. In operation, the automatic mining system begins with no predefined taxonomy of the terms and derives a generalization hierarchy such as an LGG model constructed as a Directed Acyclic Graph (DAG), from the set of terms (Ai). The generalization hierarchy maps the generalization and specialization relationships between the terms (ai).

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF THE INVENTION

The following definitions and explanations provide background information pertaining to the technical field of the present invention, and are intended to facilitate the understanding of the present invention without limiting its scope:

Crawler or spider: A program that automatically explores the World Wide Web by retrieving a document and recursively retrieving some or all the documents that are linked to it.

Gateway: A standard interface that specifies how a web server launches and interacts with external programs (such as a database search engine) in response to requests from clients.

Hypertext System: A computer-based informational system in which documents (and possibly other types of data entities) are linked together via hypertext links to form a user-navigable web.

Hypertext Link (or hyperlink): A reference link from some point in one hypertext document to another point in another document or another place in the same document. When a user activates the link (e.g. by clicking on it with the mouse) the browser will display the destination of the link.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

HTTP (Hypertext Transfer Protocol): Standard WWW client-server protocol used for the exchange of information (such as HTML documents, and client requests for such documents) between a web browser and a web server. HTTP includes several different types of messages that can be sent from the client to the server to request different types of server actions.

Internet: A collection of interconnected public and private computer networks that are linked together with routers by a set of standards protocols to form a global, distributed network.

Metadata (or annotation) of a hyperlink: Description of a hyperlink provided by the page that contains it. Ideally, it describes the concept of the linked page. This description may be found, for example, in elements around a hyperlink's anchor tags. Such elements may include attribute values or free text surrounding the hyperlink. Of these elements, anchor texts seem to be the most descriptive and frequent, and are believed to constitute serious candidates for use as annotations.

Server: A software program or a computer that responds to requests from a web browser by returning ("serving") web documents.

SGML (Standard Generalized Markup Language): A generic markup language for representing documents. SGML is an International Standard that describes the relationship between a document's content and its structure. SGML allows document-based information to be shared and re-used across applications and computer platforms in an open, vendor-neutral format. SGML is defined in "ISO 8879:1986 Information processing—Text and office systems—Standard Generalized Markup Language (SGML)", an ISO standard produced by JTC 1/SC 18 and amended by "Amendment 1:1988".

URL (Uniform Resource Locator): A unique address which fully specifies the location of a content object on the Internet. The general format of a URL is protocol://server-address/path/filename.

XML (Extensible Markup Language): A meta-language that provides a framework (or set of rules) to specify domain specific languages. Sometimes described as a simplified dialect of SGML suitable for use on the Word-Wide Web, it gives rise to such markup languages as SMIL (Synchronized Multimedia Integration Language), CML (Chemical Markup Language), MML (Mathematics Markup Language), etc.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client-server hypertext distributed information retrieval system.

Figure 1:
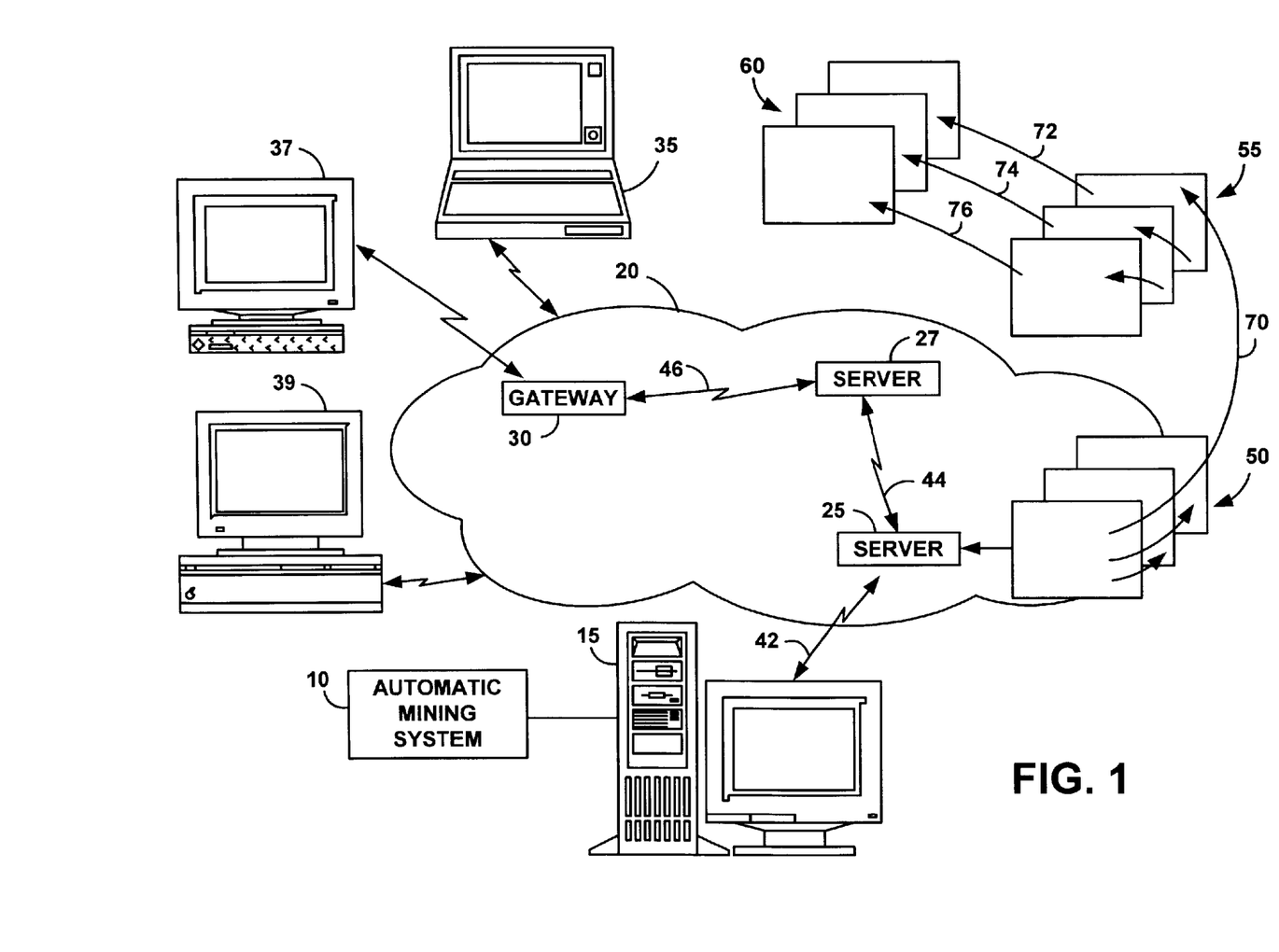
FIG. 1 is a schematic illustration of an exemplary operating environment in which the automatic mining system of the present invention may be used.

FIG. 1 portrays the overall environment in which automatic mining system 10 according to the present invention can be used. The automatic mining system 10 includes a software or computer program product which is typically embedded within, or installed on a host server 15. Alternatively, the automatic mining system 10 can be saved on a suitable storage medium such as a diskette, a CD, a hard drive, or like devices. Although the automatic mining system 10 will be described in connection with the WWW, it should be clear that the automatic mining system 10 can be used with a stand-alone database of terms and associated meanings that may have been derived from the WWW and/or another source (step 505 FIG. 5).

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote internet users are represented by a variety of computers such as computers 35, 37, 39, and can query the automatic mining system 10 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, 60. The hypertext documents 50, 55, 60 most likely include embedded hypertext links to other locally stored pages, and hypertext links 70, 72, 74, 76 to other webs sites or documents 55, 60 that are stored by various web servers such as the server 27.

Figure 2:
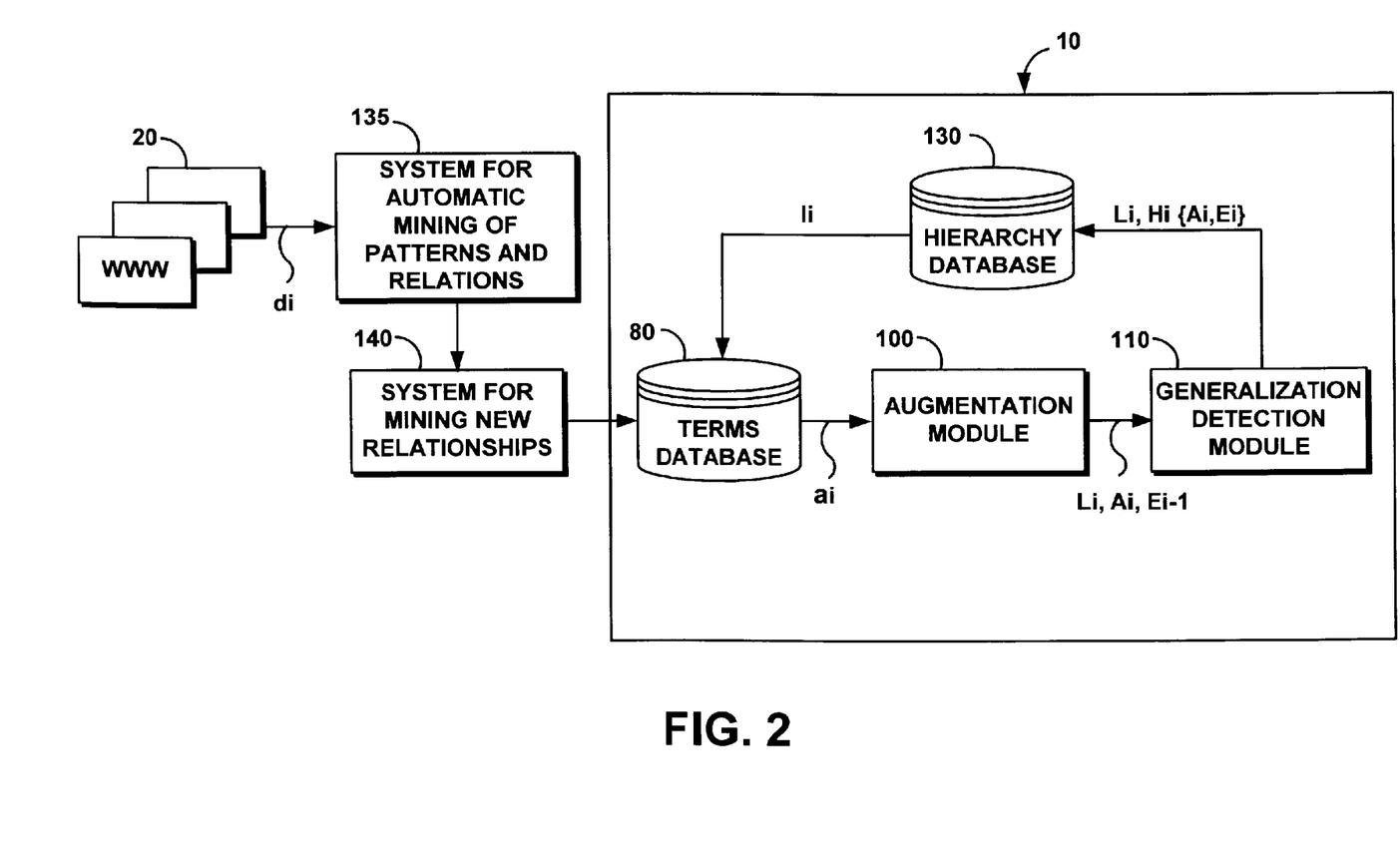
FIG. 2 is a block diagram of the automatic mining system of FIG. 1.

The automatic mining system 10 will now be described in more detail with further reference to FIG. 2. The automatic mining system 10 includes a computer program product such as a software package, which is generally comprised of a terms database 80, an augmentation module 100, a generalization detection module 110, and a hierarchy database 130. The terms database 80 stores the sets of terms (Ai) and their associated meanings (Mi), at step 510 of FIG. 5, and the hierarchy database 130 stores the generalization hierarchy (Hi) mined by the automatic mining system 10. In an alternative design, the terms database 80 and/or the hierarchy database 130 do not form part of the automatic mining system 10.

As used herein and as it will be explained later In greater detail, the set of terms (Ai) includes the generalizations (Li) that have been mined by the automatic mining system 10. The generalization hierarchy (Hi) is defined by a set of edges (Ei) and a set of terms (Ai) at step 515 of FIG. 5. The set of terms (Ai) are graphically illustrated in FIG. 4 by nodes. An edge (ei) is a hierarchical relationship between two nodes or terms, and is graphically represented by a directional line or arrow between two terms or nodes.

In one embodiment, a crawler that resides in the host server 15, visits and downloads every web page or document $d_i$ on the WWW at periodic intervals, for example about once a month. During such visits, the crawler downloads all or selected sections of the document $d_i$ to a system for automatic mining of patterns and relations 135, which is described for example in patent application Ser. No. 09/439,379, is now pending titled "System and Method for Automatic Mining of Patterns and Relations". Using the relations mined by the system 135, a system 140 mines new relationships, and stores the pairs, relations, and relationships in the terms database 80. The system 140 is described for example in patent application Ser. No. 09/440,626, is now pending titled "System and Method for Automatic Mining of New Relationships". As used herein, a "relation" is defined as the phrase that connects the components or terms in the pair, a "pair" is comprised of two related terms, such as concepts, items, persons and similar entities, and a "relationship" is the category or classification of the relations.

Having described the main components of the automatic mining system 10, its operation will now be explained in connection with the following Table 1 and the exemplary hierarchy map of FIG. 4. This hierarchy map is ultimately derived by the automatic mining system 10 from the sets of terms (Ai) and edges (Ei), and is stored in the hierarchy database 130 in the form of the entries in Table 1.

TABLE 1

SAMPLE DATABASE ENTRIES

| | Generalization Hierarchy Set Hi | | Generalizations Li |
|---|---|---|---|
| | Set of Terms Ai | Set of Edges Ei | |
| i = 0 | A0: { } | E0: { } | L0: { } |
| i = 1, SGML | A1: {SGML} | E1: { } | L1: { } |
| i = 2, XML | A2: A1 + {XML, ML} | E2: {SGML → ML; XML → ML} | L2: {ML} |
| i = 3, JSML | A3: A2 + {JSML} | E3: {E2 + JSML → ML} | L3: {ML} |
| i = 4, Java | A4: A3 + {Java} | E4: {E3 + JSML → Java} | L4: {ML} |
| i = 5, Deer | A5: A4 + {Deer} | E5: E4 | L5: {ML} |

A primary function of the augmentation module 100 is to update the set of terms (Ai), knowing the terms (ai) stored in the terms database 80. This feature is implemented by a generalization technique that determines generalization terms {li} from the terms (ai). One generalization technique that can be used in conjunction with the present invention is referred to as the "Least General Generalization" or LGG model. The LGG model is described in G. D. Plotkin, "A Note on Inductive Generalization," B. Meltzer and D. Michie, Ed., Machine Intelligence, pp.153–163, Edinburgh University Press, 1969, which is incorporated herein by reference.

According to this generalization technique, if there exists a substitution j such that w.j=u, where w and u are concept terms, w is said to subsume u. If there exists another term v such that w also subsumes v, then w is termed the LGG of the two concept terms u and v. w is said to be the generalization of both u and v, or, conversely, u and v are specializations of w.

Figure 4:
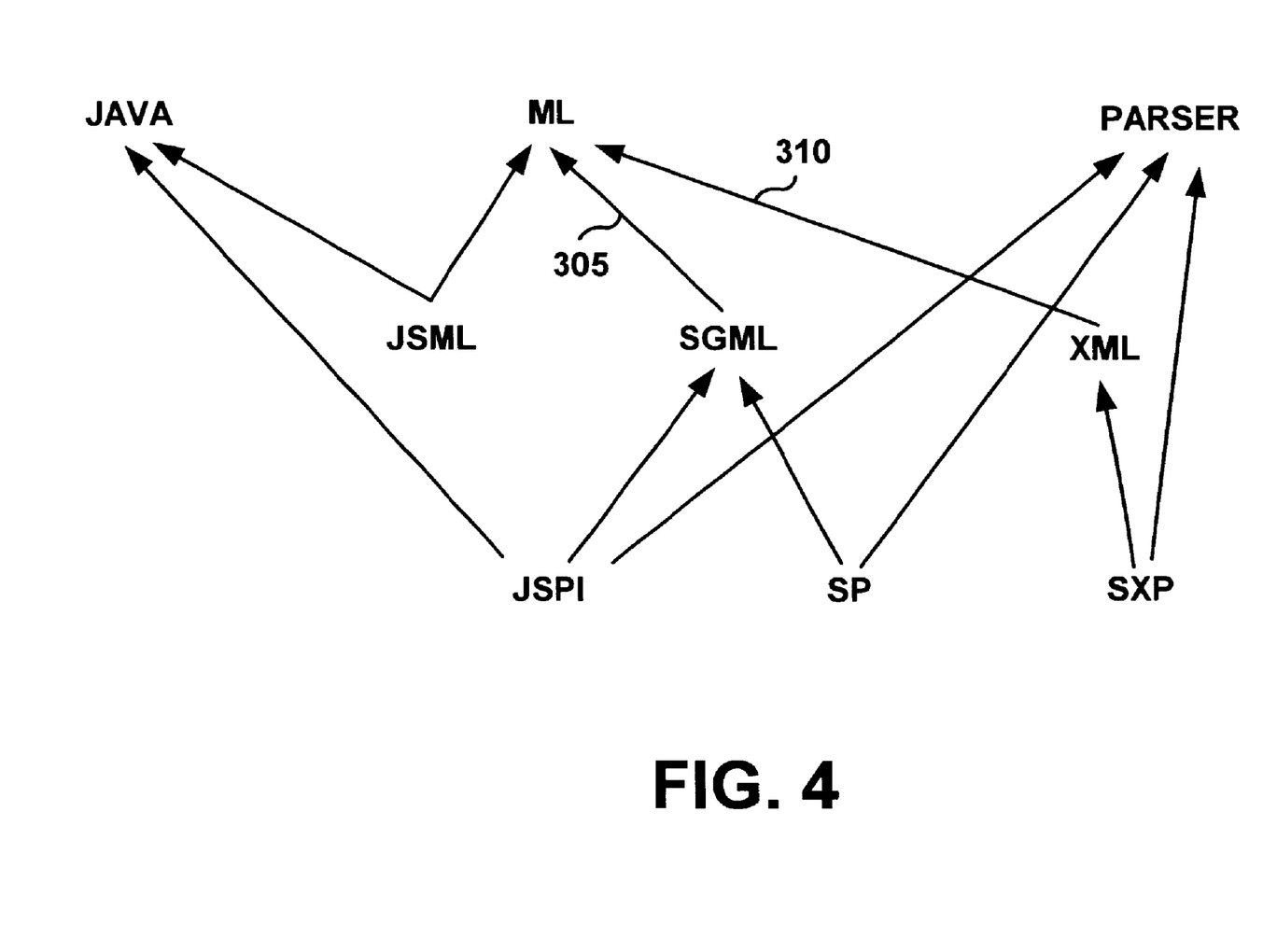
FIG. 4 is an exemplary hierarchy map derived by the automatic mining system of FIG. 2 from a subset of terms.

With reference to FIG. 4, Markup Language (ML) is the LGG of the two terms XML (extensible Markup Language) and SGML (Standard General Markup Language). Hence, ML subsumes both XML and SGML, ML is a generalization of both XML and SGML, and conversely XML and SGML are specializations of ML.

If the set of generalization or LGG terms stored in the terms database 80 are denoted by ($L_{i-1}$), the updated LGG set ($L_i$) is expressed as follows:

$$L_i = L_{i-1} + \{li\}.$$

While the automatic mining system 10 is described herein in terms of a generalization technique and generalization terms {li} or sets (Li), it should be clear that a specialization technique can alternatively be used to determine specialization terms and sets.

Figure 5:
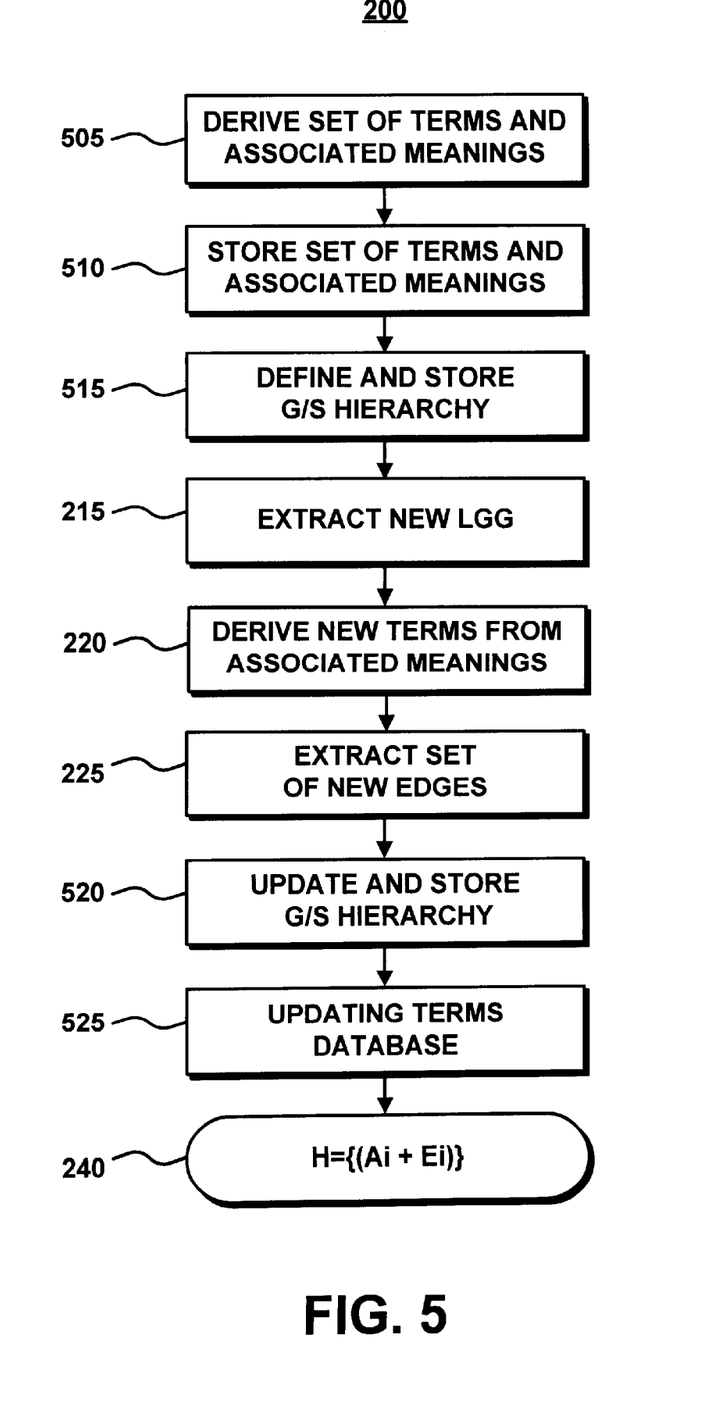

The generalization detection module 110 maps the generalized terms set (Ai) stored in the terms database 80 and the LGG terms {li} that are derived by the augmentation module 100, updates the set of edges (Ei), and derives a generalization hierarchy modeled, at step 520 of FIG. 5, for example, as a Directed Acyclic Graph (DAG).

The generalization detection module 110 sends the updated set of terms (Ai), the LGG terms ($L_i$), and the set of edges (Ei) to the hierarchy database 130 for storage, at step 525 of FIG. 5. A user can query the hierarchy database 130 for a desired hierarchical relationship. The hierarchy database 130 is connected to the terms database 80 and transfers the LGG terms {li} to it for complementing the set of terms (Ai).

The operation of the automatic mining system 10 is represented by a process 200 (FIG. 3) that starts at block or step 205 by initializing or setting the set of terms (Ai) and the set of edges (Ei) to zero. The process 200 then proceeds to block 210 where it sets i=1.

Figure 3:
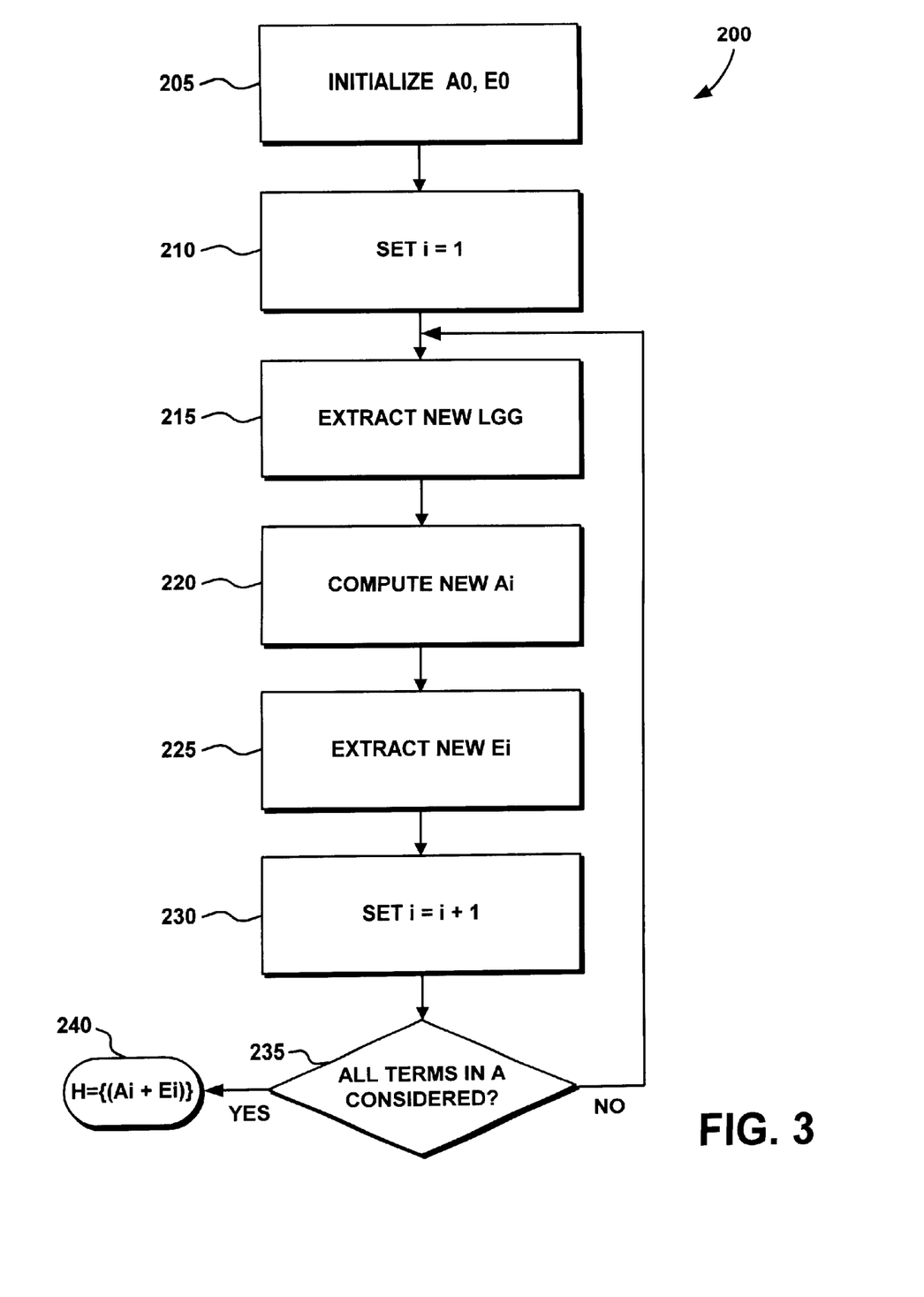
FIGS. 3 and 5 are flow charts that illustrate the operation of a preferred embodiment of the automatic mining of FIG. 2.

At step 215, the augmentation module 100 retrieves the terms (ai) from the terms database 80. In the example provided in Table 1, the augmentation module 100 retrieves the term "SGML" from the terms database 80. The augmentation module 100 does not determine the LGG for the single term "SGML", and assigns a null value to the LGG set (L0), as follows:

L0: { }.

Since this is the first iteration (i.e., i=1), the augmentation module 100 expresses the set of terms (Ai) as follows at step 220:

A1: {SGML}.

At step 225, the generalization detection module 110 assigns a zero value to the initial edge set (E0), as follows:

E0: { }, and transmits the generalization hierarchy set (H0) and the generalization set (L0) to the hierarchy database 130. The generalization hierarchy (H0) is composed of two components: the set of terms (A0), and the set of edge (E0).

At step 230, the process 200 sets i=2, in preparation for the second iteration, and inquires at the decision block 235 whether all the terms (ai) in the set of terms (Ai) have been considered. In this example, the answer is negative, and the process 200 returns to block 215 where the augmentation module 100 considers the next term "XML". The augmentation module 100 uses the set of terms (A2) which is composed of two terms {SGML, XML}, to extract the LGG term (I2) as described above. In this illustration, the LGG term (I2) is (ML), and the LGG set (L2) becomes as follows:

L2: {ML}.

At step 220, the augmentation module 100 adds the newly extracted LGG term (I2) to the set of terms (A1) to define the new set of terms (A2), as follows:

A2: {SGML, XML, ML}, where the set of terms (Ai) is generally defined by the following relationship:

$$Ai: A_{i-1} + \{ai\} + \{li\}.$$

At step 225, the generalization detection module 110 extracts the set of edges (E2) to build the generalization hierarchy (H2). Graphically, the set of edges (E2) are illustrated in FIG. 4 by two arrows 305, 310. The first arrow 305 connects the term or node (SGML) to the term or node (ML). The direction of the arrow 305 indicates the following generalization relationship between the two terms: SGML is the specialization of ML, and ML is the generalization of SGML. Similarly, the second arrow 310 connects the term or node (XML) to the term or node (ML). The direction of the arrow 310 indicates the following generalization relationship between the two terms: XML is the specialization of ML, and ML is the generalization or LLG of XML.

The generalization detection module 110 transmits the set of edges (E2) to the hierarchy database 130, where they are expressed in the following format:

E2: {SGML→ML; XML→ML}, where the set of edges (Ei) is generally defined by the following two equations:

$Ei{:}E_{i-1}+\{ei\}$, and $E_i = E_{i-1} + \{(a_i, a_j) | a_j \text{ is an LGG of } a_i, a_j \in A_i\}$ $+ \{(a_j, l_i) | l_i \text{ is an LGG of } a_j, a_j \in A_i, l \in L_i\}$.

The second equation provides four ways to induce the generalization hierarchy between the terms (ai) from the terms database 80 and the LGG terms (li).

The process 200 then sets i=3 at step 230, and inquires at step 235 whether all the terms in the set of terms (Ai) have been considered. If they have not, the process 200 repeats steps 215, 220, 225, 230 and 235, until it determines that all the terms have been considered. In which case, the process 200 proceeds to step 240 and completes the structure of the generalization hierarchy (Hi) in the hierarchy database 130, in preparation for use by users or applications.

It is to be understood that the specific embodiments of the invention that have been described are merely illustrative of certain application of the principles of the present invention. Numerous modifications may be made to automatic mining system and associated methods described herein without departing from the spirit and scope of the present invention. For example, the inventive concept of the automatic mining system 10 is applicable to acronyms and their expansions, with the augmentation module 100 analyzing the (acronym, expansion) pairs rather than single terms. To build the generalization/specialization model using LGG, the first step is to expand the known set of acronyms to include its LGGs. The process involves finding common patterns within the expansions of the acronyms in the known set. The LGGs are added to the initial set as generalized terms, resulting in a Generalized Acronym Set (GAS). The concept hierarchy of the new GAS is represented as a DAG. The process is repeated until all the acronyms are considered and no further generalization is possible. Moreover, while the present invention is described for illustration purpose only in relation to the WWW, it should be clear that the invention is applicable as well to databases and other tables with indexed entries.

What is claimed is:

1. A system for the automatic construction of a generalization-specialization hierarchy of terms from unstructured information, comprising:

a set of paired terms and meanings associated with the terms that have been derived from the unstructured information;

a terms database for storing the paired set of terms and associated meanings;

a generalization-specialization hierarchy that is defined by a set of edges between the terms stored in the terms database, wherein each edge is determined by a hierarchical relationship between two terms;

a hierarchy database for storing the generalization-specialization hierarchy;

an augmentation module for deriving new terms from the associated meanings, which new terms are not stored in the terms database;

a generalization-specialization detection module for iteratively deriving generalizations and specializations from the terms stored in the terms database and the new terms derived from the associated meanings;

the generalization-specialization module extracting a set of new edges from the generalizations and specializations, and updating the generalization-specialization hierarchy by updating the set of edges with the new edges that have been extracted from the generalizations and specializations;

the hierarchy database storing the generalization-specialization hierarchy that has been updated;

wherein the terms database is updated with the new terms that have been derived from the associated meanings and the generalizations and specializations; and wherein the hierarchy database is queriable for a desired hierarchical relationship.

2. The system according to claim 1, wherein the augmentation module derives the generalizations and specialization based on a Least General Generalization model.

3. The system according to claim 1, wherein the augmentation module derives the generalizations and specialization based on a Directed Acyclic Graph.

4. A computer program product for the automatic construction of a generalization-specialization of terms from unstructured information, comprising:

a set of paired terms and meanings associated with the terms that have been derived from the unstructured information;

a terms database for storing the paired set of terms and associated meanings;

a generalization-specialization hierarchy that is defined by a set of edges between the terms stored in the terms database, wherein each edge Is determined by a hierarchical relationship between two terms;

a hierarchy database for storing the generalization-specialization hierarchy;

an augmentation module for deriving new terms from the associated meanings, which new terms are not stored in the terms database;

a generalization-specialization detection module for iteratively deriving generalizations and specializations from the terms stored in the terms database and the new terms derived from the associated meanings;

the generalization-specialization module extracting a set of new edges from the generalizations and specializations, and updating the generalization-specialization hierarchy by updating the set of edges with the new edges that have been extracted from the generalizations and specializations;

the hierarchy database storing the generalization-specialization hierarchy that has been updated;

wherein the terms database is updated with the new terms that have been derived from the associated meanings and the generalizations and specializations; and wherein the hierarchy database is queriable for a desired hierarchical relationship.

5. The computer program product according to claim 4, wherein the augmentation module derives the generalizations and specialization based on a Least General Generalization model.

6. The computer program product according to claim 4, wherein the augmentation module derives the generalizations and specialization based on a Directed Acyclic Graph.

7. A method for the automatic construction of a generalization-specialization of terms from unstructured information, comprising:
- deriving a set of paired terms and meanings associated with the terms from the unstructured information;
- storing the paired set of terms and associated meanings in a terms database;
- defining a generalization-specialization hierarchy by a set of edges between the terms stored in the terms database, wherein each edge is determined by a hierarchical relationship between two terms;
- storing the generalization-specialization hierarchy in a hierarchy database;
- deriving new terms from the associated meanings, which new terms are not stored in the terms database;
- iteratively deriving generalizations and specializations from the terms stored in the terms database and the new terms derived from the associated meanings;
- extracting a set of new edges from the generalizations and specializations;
- updating the generalization-specialization hierarchy by updating the set of edges with the new edges that have been extracted from the generalizations and specializations;
- storing the generalization-specialization hierarchy that has been updated in the hierarchy database;
- updating the terms database with the new terms that have been derived from the associated meanings and the generalizations and specializations; and
- wherein the hierarchy database is queriable for a desired hierarchical relationship.

8. The method according to claim 7, wherein deriving the generalizations and specializations includes using a Least General Generalization model.

9. The method according to claim 7, wherein deriving generalizations and specializations includes providing a Directed Acyclic Graph.

* * * * *